United States Patent [19]

Hutchings et al.

[11] Patent Number: 5,674,970

[45] Date of Patent: Oct. 7, 1997

[54] PHENOLIC POLYMERS MADE BY ARALKYLATION REACTIONS

[75] Inventors: David A. Hutchings, Tucker; Jeffrey L. Mills, Newnan, both of Ga.; Kenneth Bourlier, Randolph, N.J.

[73] Assignee: Georgia-Pacific Resins, Inc., Atlanta, Ga.

[21] Appl. No.: 501,516

[22] Filed: Jul. 12, 1995

[51] Int. Cl.$^6$ .......................... C08G 63/78; C08G 63/87
[52] U.S. Cl. ...................... 528/205; 528/97; 568/717; 568/731; 568/734; 568/744
[58] Field of Search ............... 528/205, 97; 568/717, 568/731, 734, 744

[56] References Cited

U.S. PATENT DOCUMENTS

| | | |
|---|---|---|
| 2,224,837 | 12/1940 | Rosenthal et al. |
| 2,665,312 | 1/1954 | Ohimann et al. |
| 2,687,383 | 8/1954 | D'Alelio |
| 2,978,515 | 4/1961 | Conklin et al. ............ 260/619 |
| 3,004,953 | 10/1961 | Sonnabend ............ 260/62 |
| 3,177,166 | 4/1965 | Gregory et al. |
| 3,328,489 | 6/1967 | Murdock |
| 3,420,915 | 1/1969 | Braithwaite |
| 3,546,173 | 12/1970 | Hunt |
| 3,808,279 | 4/1974 | Buysch et al. ............ 260/619 B |
| 3,936,510 | 2/1976 | Harris et al. |
| 3,979,462 | 9/1976 | Krimm et al. ............ 260/619 B |
| 3,996,160 | 12/1976 | Dale et al. ............ 252/404 |
| 3,996,198 | 12/1976 | Wang et al. |
| 3,996,199 | 12/1976 | Weinshenker et al. |
| 4,085,085 | 4/1978 | Tsuchiya et al. |
| 4,110,540 | 8/1978 | Freitag et al. ............ 568/718 |
| 4,127,564 | 11/1978 | Sanborn |
| 4,210,733 | 7/1980 | Hayashi et al. |
| 4,307,012 | 12/1981 | Serres, Jr. |
| 4,310,657 | 1/1982 | Serres, Jr. |
| 4,380,554 | 4/1983 | Serres, Jr. |
| 4,403,088 | 9/1983 | Smith et al. ............ 528/205 |
| 4,432,921 | 2/1984 | Haars et al. |
| 4,639,503 | 1/1987 | Hara et al. |
| 4,666,974 | 5/1987 | Keskey et al. |
| 4,690,995 | 9/1987 | Keskey et al. |
| 4,824,929 | 4/1989 | Arimatsu et al. |
| 4,897,438 | 1/1990 | Kikuchi et al. |
| 4,900,671 | 2/1990 | Pokora et al. |
| 4,927,905 | 5/1990 | Bogan |
| 4,968,759 | 11/1990 | Kikuchi et al. |
| 5,043,483 | 8/1991 | Sogli et al. ............ 568/744 |
| 5,102,962 | 4/1992 | Kikuchi et al. |
| 5,270,403 | 12/1993 | Mori |

FOREIGN PATENT DOCUMENTS

| | | |
|---|---|---|
| 506080 A2 | 9/1992 | European Pat. Off. |
| 2 337 185 | 7/1977 | France |
| 28 16 112 | 4/1978 | Germany |
| 3541210A1 | 5/1986 | Germany |
| 8-73570 | 3/1996 | Japan |

OTHER PUBLICATIONS

P. L. Dubin et al., "Observed Biomodality in a Branched Condensation Polymerization", pp. 117–120.

P. L. Dubin et al., "Biomodal Molecular Weight Distributions of a Branched Condensation Polymer," *J. Polymer Science*, vol. 20, pp. 1709–1716 (1982).

*Primary Examiner*—James J. Seidleck
*Assistant Examiner*—Duc Truong
*Attorney, Agent, or Firm*—Banner & Witcoff, Ltd.

[57] ABSTRACT

The present invention is directed to the formation of phenol alkylation polymers which release negligible phenol and formaldehyde emissions. The phenol aralkylation polymers of the present invention are derived from a phenolic monomer, at least one styrene derivative and an aryl diolefin. In addition to the phenolic monomer, styrene derivative and aryl diolefin, other reactants may be introduced to produce a product with particular properties.

35 Claims, No Drawings

PHENOLIC POLYMERS MADE BY ARALKYLATION REACTIONS

This invention is directed to the formation of phenol aralkylation polymers. The polymers produced in accordance with the present invention release negligible phenol and formaldehyde emissions.

The polymer class within the scope of the present invention exhibits unique compatibility with oils and alkyd coating systems as well as a broad range of polymer systems including urethanes, epoxies, acrylates, and others which show performance benefits from the additions of phenolics and related aromatic components.

BACKGROUND OF THE INVENTION

It is well-established that substituted phenols such as butyl, amyl, and phenyl phenol react with formaldehyde to form modifiers for oil and alkyd varnishes. These modifiers have been used for many years. Phenolics are used to upgrade corrosion properties, improve adhesion, and improve substrate wetting. They can be "cooked" with various drying oils or simply cold blended with oils or alkyds to produce spar varnishes and metal primers. Although phenolics having some excellent performance properties, such as excellent adhesion and good corrosion properties, other properties are not so desirable. Phenolics have a relatively high viscosity which excludes their use in very low V.O.C. applications. Furthermore, phenolics turn dark in color upon aging which limits their use in some primer and most topcoat systems because of color bleed-through. For instance, the use of phenolics in exterior metal paints is limited to primers since the phenolics in such coatings darken (bleed through) with time, changing the color of light topcoats. Even when it is the primer that contains a phenolic, topcoats must be dark in color in order to not show bleed-through. Typically primers are red or gray. It is believed that darkening upon aging is caused by the formation of quinone methides in the phenolic polymer.

Phenolics having lower solution viscosities are desired in order to reduce solution viscosities in spar varnishes, bridge paints, porch and deck enamels, and government specification paints.

Phenolics are generally used in conjunction with oils or alkyds for exterior primers. Due to environmental pressures and the commercialization of new polymer systems such as urethanes, these types of phenolics represent a shrinking market.

There has been very little change in the basic chemistry of the phenolic resins since their introduction over 70 years ago. Generally, phenolic resins for oils and alkyds are novolak polymers based on substituted phenols. Originally, they were based on p-phenyl-phenol. This monomer offered a preferred combination of oil solubility, color retention and corrosion resistance.

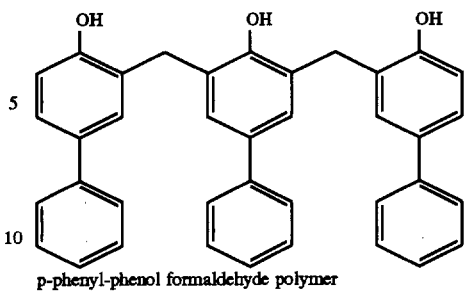

p-phenyl-phenol formaldehyde polymer

Because of the high price and limited availability, polymers based on p-phenyl-phenol have been discontinued. A lower priced but less effective substitute is a polymer based on p-t-butyl phenol.

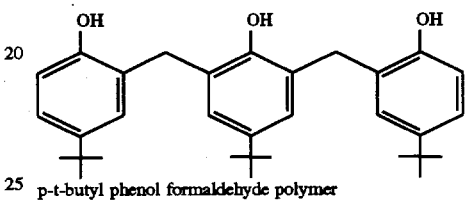

p-t-butyl phenol formaldehyde polymer

The physical properties of the p-t-butyl phenol resins are not as good as those of the p-phenyl phenol based resins. The p-t-butyl phenol imparts good oil solubility and limits color body formation when compared to other types of phenols. However, the methylene linkages allow the formation of quinone methides. It is the presence of quinone methides which is a major reason why the polymers will darken over time. It is believed that the phenyl group has better performance properties when compared to an alkyl group.

Improvements in color and corrosion resistance can be made by substituting some bisphenol-A for p-t-butyl phenol. It is generally accepted that the isopropylidene linkage in the bisphenol-A molecule decreases the tendency for quinone methide formation in phenolic polymers. Unfortunately bisphenol-A, because of the two hydroxyl groups, has very poor solubility with oils and the common solvents used in coating formulations. Therefore, only modest modifications with bisphenol-A can be used for these polymers.

SUMMARY OF THE INVENTION

The present invention is directed to the formation of a class of phenol aralkylation polymers which exhibit improved oil solubility, improved compatibility with oil and alkyd-based polymers, as well as urethanes, epoxies and acrylates and a decreased tendency for color body formation and resultant darkening of coatings in which they are incorporated. The polymers can be made free of formaldehyde and phenol.

The present invention is directed to the formation of a phenol aralkylation polymer by aralkylating a phenolic monomer with at least one styrene derivative to obtain an aralkylated phenol, then reacting the aralkylated phenol with an aryl diolefin to obtain the phenol aralkylation polymer, with the aralkylated phenol joined to the aryl diolefin. Those skilled in the art will recognize the primary linkage is at the ortho position. This process produces a lower melting point polymer.

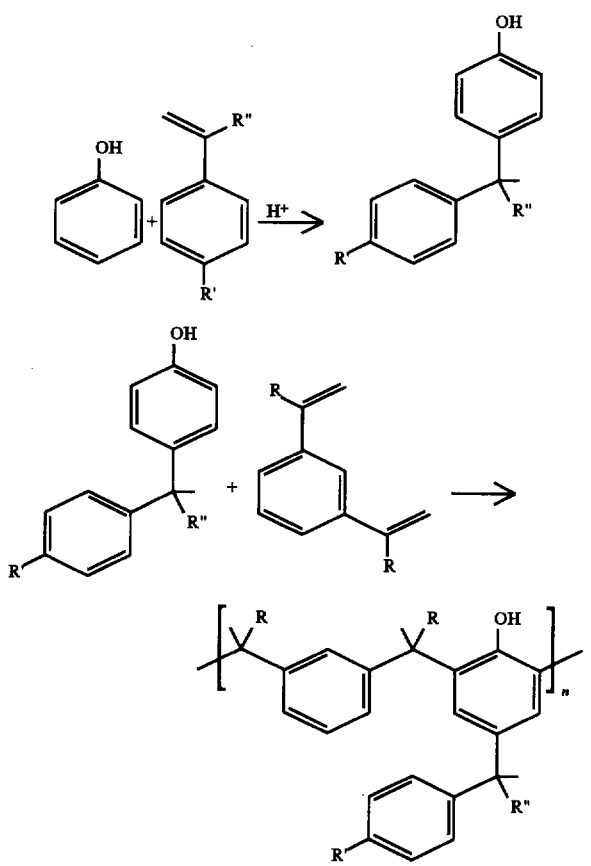

It will also be noted that the structures described in this text represent idealized average structures of the type those skilled-in-the-art use to represent phenolic-type polymers. In actuality, such polymers are complex mixtures containing a range of compositions and which contain analogues of the structures depicted.

The present invention is also directed to the formation of a phenol aralkylation polymer by reacting a phenolic monomer with an aryl diolefin to obtain a phenol/aryl diolefin polymer and then aralkylating the phenol/aryl diolefin polymer with at least one styrene derivative to obtain phenol aralkylation polymer, with a portion of the phenolic component joined to the aryl diolefin with a portion of the phenolic linkages being p in orientation. This process produces a higher melting point polymer.

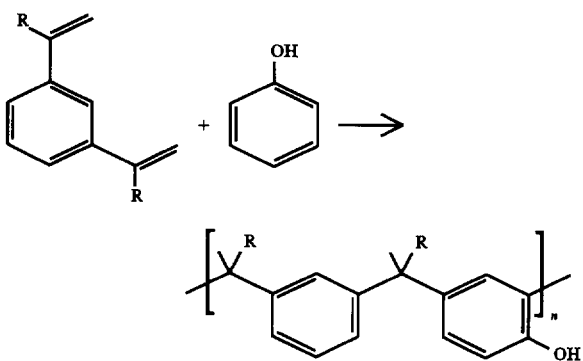

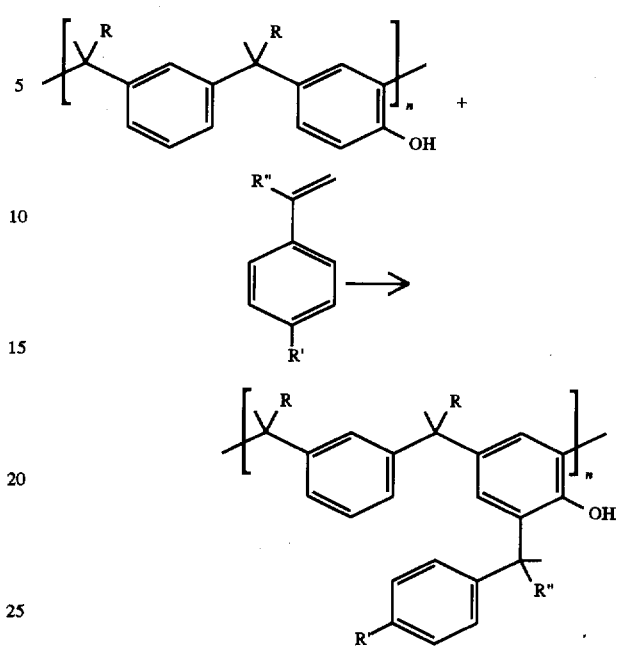

It is to be understood that both the foregoing general description and the following detailed description are exemplary and explanatory only and are not restrictive of the present invention as claimed.

DETAILED DESCRIPTION OF THE INVENTION

The present invention is directed to a class of phenol aralkylation polymers which impart good oil solubility, limit color body formation and show a decreased tendency to darken over time. The phenol aralkylation polymers of the present invention evolve low phenol and formaldehyde emissions, and have excellent adhesion and corrosion properties. Also, the products of the invention have high solubility in non-aromatic (Hazardous Air Pollutants "HAP's") free) solvents. Further, the incorporation of an aryl diolefin into a phenolic polymer results in the formation of polymer systems useful for incorporation with many other polymers which include but are not limited to urethane, epoxy, and acrylate polymer systems. The increase in aromatic character of the phenolic polymer results in an enhancement in their ranges of compatibility with the aforementioned polymer class, and also generally leads to the enhancement of physical properties, adhesion, and barrier property performance.

The phenol aralkylation polymers of the present invention are derived from a phenolic monomer, at least one styrene derivative and an aryl diolefin. In addition to the phenolic monomer, styrene derivative and aryl diolefin, other reactants may be introduced to produce a product with particular properties.

The phenol aralkylation polymers are produced by a process having at least two reaction steps. The order of the reaction of the three reactants is arranged to provide a phenol aralkylation polymer product having desired properties. For instance, at least one styrene derivative is reacted with a phenolic monomer and then the product thereof is reacted with an aryl diolefin. Alternatively, a phenol monomer is reacted with an aryl diolefin, and then the product thereof is reacted with at least one styrene derivative. Similarly, a portion of either the styrene or aryl diolefin may be withheld for later reaction to achieve a predetermined polymer composition exhibiting a desired performance characteristic.

Reactants

The styrene derivatives may be any of the aryl substituted alkene hydrocarbons. Examples include styrene, α-methyl styrene, p-methyl styrene, p-t-butyl styrene, α-methyl-p-methyl styrene, β-methyl styrene, m-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, isopropenyl naphthalene, 2-methyl-1,1-diphenyl propene, 1-phenyl-1-pentene, and the like. Mixed styrene derivatives means a mixture of, for example, p- and m- t-butyl styrenes. The preferred styrene derivatives are styrene and homologs of styrene of the formula $$Ar-\underset{R_1}{\overset{R_2}{C}}=\underset{R_3}{C}$$

Where Ar may be phenyl, naphthyl, biphenyl, or substituted phenyl, naphthyl, or biphenyl. In the later case, examples of substitutions may be:

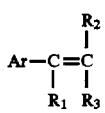

Where $R_4$ and $R_5$ are independently methyl, ethyl, $C_3$ to $C_{10}$ alkyl, or a halogen. $R_1$, $R_2$ and $R_3$ are independently hydrogen, an alkyl radical containing 1 to 5 carbon atoms, an aromatic or an alkyl aromatic. $R_1$, $R_2$ and $R_3$ can be other functionalities such as a carboxyl as in the case of cinnamic acid.

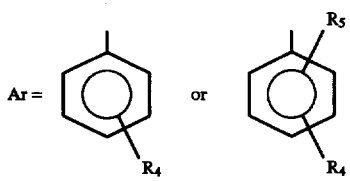

Such systems are particularly valuable as a means of introducing carboxyl functionality

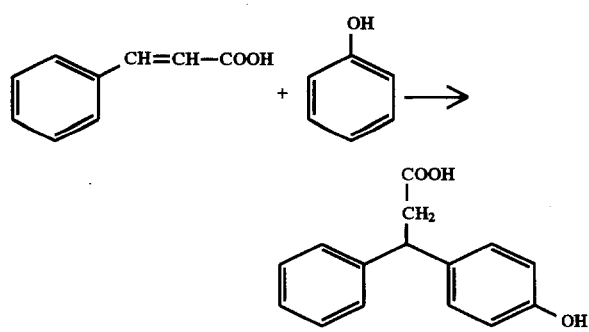

Esters of styrene derivatives may also be used. $R_1$, $R_2$ and $R_3$ can be carboxyl (—CO$_2$H) or alkoxy (—O—R) groups.

Preferably, the styrene derivative is styrene, α-methyl styrene, p-t-butyl styrene, m-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, or mixtures thereof.

The aryl diolefin can be represented by the following formula

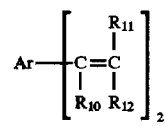

Wherein Ar is benzene, naphthalene, or biphenyl; $R_{10}$, $R_{11}$ and $R_{12}$ independently are a hydrogen or an alkyl radical containing 1–5 carbon atoms. The orientation on the benzene ring is meta or para or mixtures thereof.

Possible substitutions for naphthalene include 1–3, 1–4, 1–5, 1–6, 1–7, 2–4, 2–5, 2–6, 2–7 or 2–8 and corresponding mixtures thereof.

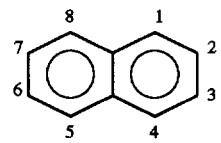

Possible substitutions for biphenyl include 1–3, 1–2', 1–1', 1–3', 2–3', and 3–3', and corresponding mixtures thereof.

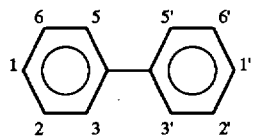

The aromatic nucleus may be substituted with various R groups, for example, methyl and t-butyl.

Preferably the aryl diolefin is m- or p-diisopropenyl benzene (DIPB) or their m, p mixtures or mixed m/p divinylbenzene (DVB) of any of the commercially available concentrations. m-DIPB is commercially available at a 98% concentration. DVB is available at concentrations of, for example, 53%, 62%, and 80%. DVB concentrations also contain ethyl-styrene (vinyl ethyl benzene). For instance, 80% DVB contains approximately 20% ethyl styrene. Diols derived from DIPB such as m or p diols of diisopropyl benzene are acceptable diolefin materials.

Diols derived from DIPB such as m or p diols of diisopropenyl benzene are acceptable precurser materials for aryl diolefins since they can be considered blocked aryl diolefins.

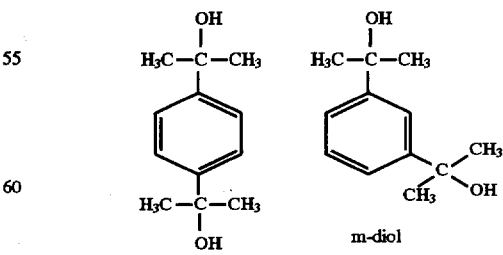

p-diol          m-diol

All or a portion of the styrene derivatives or aryl diolefin may be produced in situ by dehydration of methyl benzylic alcohols at reaction temperatures above 100° C. and acidities sufficient to promote dehydration of the benzylic alcohols. The resulting styrene derivative or aryl diolefin may be reacted with a phenolic monomer. Other means to produce the reactants in situ that are within the skill of the art are within the scope of the present invention.

In the following set of reactions, it is shown that cumyl alcohol and α-methyl styrene both generate the same benzylic carbonium ion which is the recognized intermediate required for generation the subject styrenated or divinylarylated phenolic polymers. It will be noted that use of the DIPB diols requires their incremental addition to a phenolic containing reaction mixture under conditions allowing the simultaneous removal of the water produced from removal of the blocking group.

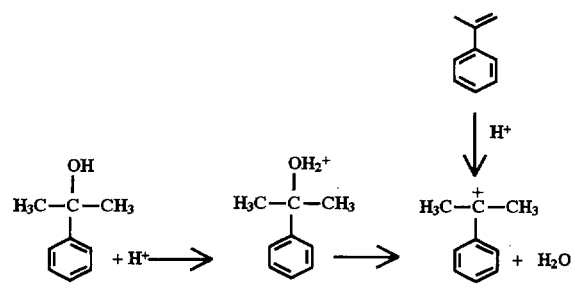

Phenol Monomers

The phenolic monomers include phenols which contain at least two free reactive positions. For example, in the case of phenol and substituted phenols, monomers contain at least two free reactive (ortho- or para-positions). Examples include phenol itself, o-, p- and m-cresol, m-isopropyl phenol, 3,5-xylenol, 3,5-diisopropyl phenol and mixtures of these compounds. Specific classes include:

I. Phenolic monomers containing mononuclear phenolic substituents are shown by the formula:

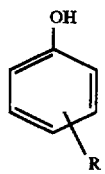

Substitution may be ortho, meta, or para. R may be methyl, ethyl, isopropyl, n-propyl, t-butyl, isobutyl, n-butyl, 5–10 aliphatic substituents, phenyl, or a substituent derived from aralkylation with styrene derivatives, e.g styrene, p-methyl styrene, t-butyl styrene, mixed t-butyl styrenes, α-methyl styrene, and vinyl toluenes.

II. Polyhydroxy mononuclear and polynuclear phenolic monomers include:

(1) Hydroquinone, resorcinol, and catechol

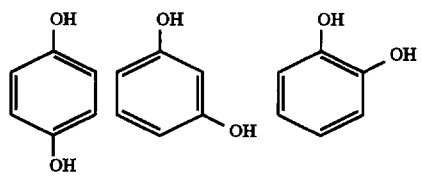

(2) Alkyl or aralkyl, mono and disubstituted, hydroquinones

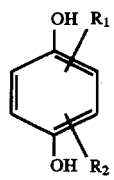

wherein the substitutions of $R_1$ and $R_2$ on the ring include 2,3; 2,5; and 2,6, and $R_1$ and $R_2$, independently, can be hydrogen, alkyl having 1–10 carbon atoms, and aralkyl derived from styrenes as benzylic derivatives, as previously described. $R_1$ and $R_2$ can also be divinyl aromatics, which can give rise to chain extended systems, as taught herein, for monohydroxy phenolic monomers. The latter system advantageously requires minimal incorporation of the dihydroxy monomer into the polymeric product to achieve the desired high hydroxy functionality.

(3) Alkyl or aralkyl, monosubstituted resorcinol

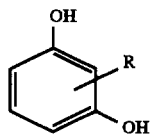

wherein R is in the 2, 4, or 5 position on the ring. R can be hydrogen, alkyl having 1–10 carbon atoms, aralkyl derived from styrenes or benzylic derivatives, as previously described. R can be divinyl aromatic, which can give rise to chain extended systems, as taught for the monohydroxy phenolic monomers. Advantages of the latter systems include minimal incorporations of the subject monomer into an alkylation polymer to achieve the desired high hydroxy functionality.

Resorcinol can also be used in the disubstituted (alkyl or aralkyl) mode to produce lower functionality polymers and in combination with difunctionally reactive monomers such as hydroquinone or monosubstituted phenolics, as described herein.

(4) Alkyl or aralkyl, substituted catechol

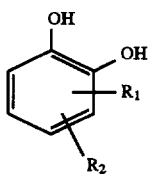

wherein the substitutions of $R_1$ and $R_2$ on the ring include 3,4 or 3,5 and wherein $R_1$ and $R_2$, independently, can be hydrogen, alkyl having 1–10 carbon atoms, aralkyl derived from styrenes, or benzylic derivatives, as previously described. $R_1$ and $R_2$ can also be divinyl aromatics, which can give rise to chain-extended systems, as taught for the monohydroxy phenolics. The latter system also advantageously requires minimal incorporation of the dihydroxy monomer into the polymeric product to achieve the desired high hydroxy functionality.

(5) Alkyl or aralkyl, substituted polyhydroxy-polycyclic aromatic phenols. Examples include:
(a) Dihydroxynaphthalenes: 1,2; 1,3; 1,4; 1,5; 1,6; 1,7; 1,8; 2,3; 2,4; 2,5; 2,6; 2,7; 2,8.
(b) Dihydroxy derivatives of anthracene, phenanthracene, etc.

III. Polynuclear phenolic monomers include:

(1) Bisphenol A.
(2) Bisphenol F (a mixture of the following three molecules)

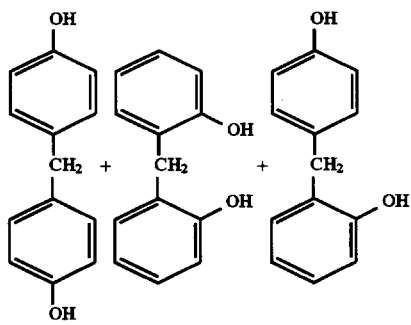

(3) Dihydroxy biphenyl-bisphenols derived from various means.

a) p,p'dihydroxybisphenyl.
b) disubstituted bisphenols derived from coupling of monosubstituted alkyl phenolics by action of the enzymatic coupling of phenols (Mead Process). The Mead Process is described in, for example, U.S. Pat. No. 4,900,671 which is hereby incorporated by reference.

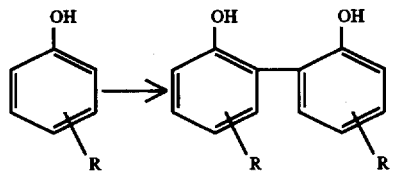

(4) Bisphenols or polymeric phenols coupled by aldehydes or ketones.

a)

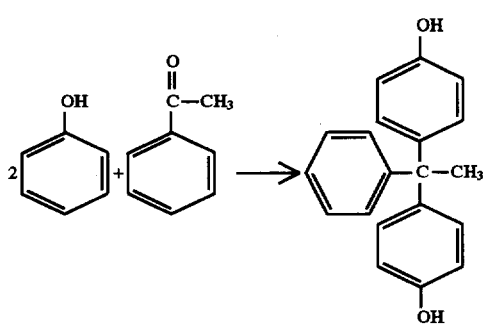

b)

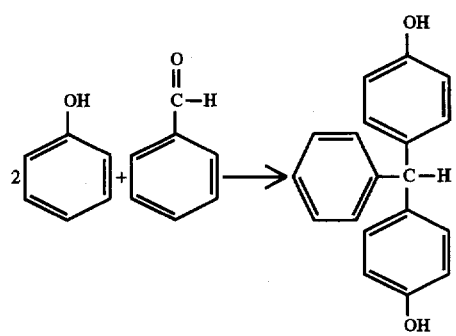

The phenolic monomers may be employed as an initial phenolic monomer in the reaction or may be employed as an additional phenolic monomer later in the reaction. Whether the phenolic monomer is used at an initial stage or as an additional component depends on the particular reaction scheme employed as discussed later. Preferred initial phenolic monomers are phenol, bisphenol A and bisphenol F. Other preferred phenolic monomers include p-t-butyl phenol, p-cumyl phenol, and p-octyl phenol which may be used as initial phenolic monomers or additional phenolic monomers depending on the particular reaction scheme employed. Polymers produced from the above monomers may also be used as the phenolic monomer.

The aryl diolefin is used at a range of mole ratios relative to the phenolic component. The mole ratio of aryl diolefin to phenolic component may be from 0.2:1 to 1.1:1. The mole ratio>1 is used under circumstances in which alkyl or aralkyl substituted phenolics are used and in which high molecular weight product is desired. The lower end of the mole ratio range is employed under circumstances where a low level of chain extension is required. The amount of aryl diolefin also depends on the amount of phenolic hydroxy substitution on the phenolic prepolymer or monomer used. In the case of bisphenol A (a di-functional phenolic monomer), less aryl diolefin may be required to give a desired degree of phenolic functionality, because the monomer is higher in both molecular weight and functionality to start with. Similarly, a formaldehyde-linked phenolic polymer can be further coupled with aryl diolefins to build molecular weight to desired levels. The converse is also true that an aralkylation polymer formed from phenolic and aryldiolefin components can be further increased in molecular weight by reaction with formaldehyde under the conditions used to prepare the aralkylation system. A preferred range of mole ratio is 0.4:1 to 0.8:1.

The degree of styrenation employed with this polymer class can also vary. For the purposes of this invention, the degree of styrenation is defined as the ratio between the moles of styrene derivatives used and the molar equivalent of open reactive positions per phenolic monomeric component. The degree of styrenation is determined by subtracting the number of reactive positions used to couple with the aryl diolefin or other linking group from the total number of reactive positions per monomers. For example, phenol is considered to have 3 reactive positions. If two phenol molecules are coupled with an aryl diolefin, two open positions remain per phenol ring. The theoretical mole ratio for styrenation (moles of styrene per phenol molecule) is therefore 2. For the present invention, the effective range for styrenation is from 20 to 100 percent of the theoretical mole ratio with the most effective range being 40 to 95 percent of theoretical.

Process

One embodiment of the present invention is directed to the formation of a phenol aralkylation polymer by aralkylating a phenolic monomer with at least one styrene derivative to obtain an aralkylated phenol, then reacting the aralkylated phenol with an aryl diolefin to obtain the phenol aralkylation polymer, with the aralkylated phenol joined to the aryl diolefin. Those skilled in the art will recognize the primary linkage is at the ortho position.

In accordance with this embodiment, a phenolic monomer and at least one styrene derivative are reacted in the presence of an acid catalyst. The pH of the reaction mixture is lowered by means of acid catalyst addition. Since the system is generally low in water content, the effective acidity of the catalyst system is increased.

Acid catalysts which may be used include but are not limited to:

Alkylsulfonic acids—methane, ethane, and higher alkyl $C_3-C_{10}$;

Arylsulfonic acids, toluene, xylene, and mixtures thereof; also, naphthalene sulfonic and aralkylated toluene, benzene, or naphthalene sulfonic acids containing $C_1-C_{10}$ alkyl substituents;

Phenol sulfonic and sulfonated phenolic polymers which may include aralkylated phenolics;

Sulfuric acid;

Phosphoric acid;

Alkyl, aryl or aralkyl phosphate esters having at least one free acidic proton per molecule;

Hydrochloric acid;

Latent acid catalyst systems including organic acid chlorides, phosphorous oxychlorides, and the like;

Latent acid catalysts derived from mines and the above;

Oxalic acid, maleic acid and other strong organic diacids having initial pKa's<1.5; and Halogenated organic acids such as chloroacetic and trifluoroacetic acid.

The amount of acid catalyst required depends on the effective acidity and type of catalyst selected. Strong acids such as sulfonic and methane sulfonic require quantities less than 0.20 percent based on the total reactive charge providing that said reactants do not contain basic impurities. It will be noted that dilute solutions of said acids can be used providing that provisions are made to remove water from the reaction mixture. Weaker acids require the use of larger quantities (quantities of catalyst) with those skilled in the art being familiar with methods for optimization.

The temperature of the reaction depends on a number of factors and is preferably between 120°–160° C. The temperature selected depends on the nature of the aralkylating agent and requires optimization for each system. In some instances, high temperatures are desired to insure against o-aralkylation of the phenolics or in others lower temperatures are desirable to minimize retroaralkenylation with the resultant formation of undesired arylolefin coupling products. In any case, the reaction time required can vary significantly, but is generally achieved in the 10–30 minute time frame at the average (140° C.) reaction temperature. This combination of conditions can be applied to all combinations of phenol, substituted phenols, and phenol aralkylation products with either styrene, its derivatives, or aryldiolefins. It is worth noting that the aralkylation reaction is stopped completely by neutralization of the acid catalyst, and that systems so stabilized can be heated to temperatures in the 200°–250° C. range for substantial periods without de-aralkylations or other similar decompositions.

The phenolic monomer is selected to provide an aralkylated phenol and is preferably phenol, bisphenol A or bisphenol F. Additional phenolic monomers may be added prior to reacting the aralkylated phenol with the aryl diolefin such as p-t-butyl phenol, p-cumyl phenol and p-octyl phenol. It is within the skill of the art to determine what phenolic monomers are appropriate to react with the styrene derivative to obtain an aralkylated phenol and what phenolic monomers may be added later to build the polymer.

The aralkylated phenol product is then reacted with an aryl diolefin to obtain the phenol aralkylation polymer, with the aralkylated phenol joined to the aryl diolefin primarily at the o-position. The pH of the reaction mixture is lowered by means of acid catalyst addition. The same catalysts can be considered for diolefin reaction with the styrenated phenols as were used to promote the reaction of phenol or its derivatives with arylolefins. Indeed, in practice of this invention, the same catalyst system is normally used to conduct the divinyl aromatic-phenolic polymerization reaction as was used for the precursor phenolic reactant styrenation.

After conducting the aralkylation reactions, the final product can be neutralized with caustic, potassium hydroxide, or generally any alkaline material.

As a non limiting example for illustrative purposes only, the reaction of α-methyl styrene with phenol is set forth below.

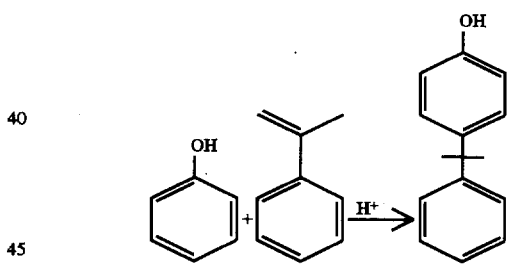

In a comparison with bisphenol A, the aralkylated phenol product is missing a hydroxyl group and thus does not have the poor compatibility with oils or solvents that are exhibited by bisphenol A.

The aralkylated phenol is then reacted with m-diisopropenylbenzene.

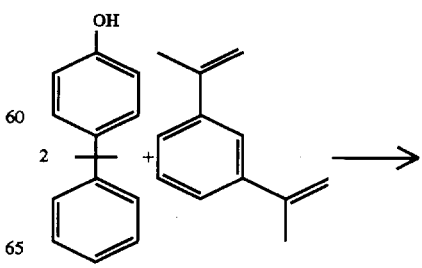

-continued

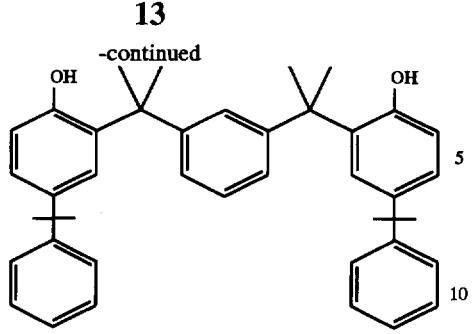

Since the para position on the phenol has already been aralkylated, the only place for the aryl diolefin (DIPB) to react is at an ortho position. Polymers produced by initially reacting phenol with a styrene derivative result in lower melting point polymers.

Another embodiment employing this reaction scheme initially reacts a phenolic monomer with two styrene derivatives. For example, bisphenol A is reacted with t-butylstyrene and α-methyl styrene.

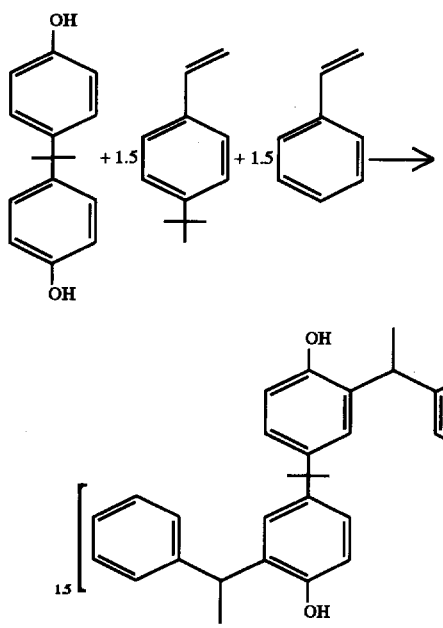

The styryl substituted bisphenol A systems can be further reacted with divinyl aromatics to achieve chain-extended polymer systems useful in coating and other applications. These systems have good solubility in mineral spirits.

Another embodiment of the present invention is directed to the formation of a phenol aralkylation polymer by reacting a phenolic monomer with an aryl diolefin to obtain a phenol/aryl diolefin polymer and then aralkylating the phenol/aryl diolefin polymer with at least one styrene derivative to obtain the phenol aralkylation polymer, with the phenol joined to the aryl diolefin, as those skilled in the art will recognize, primarily at the ortho and para positions.

In accordance with this embodiment, a phenol and an aryl diolefin are reacted to form a phenol/diolefin polymer. The pH of this reaction mixture is lowered by means of acid catalyst additions. The same catalyst systems and processing conditions are required for these embodiments as were described earlier for aralkylation of the unsubstituted phenolic systems using styrene or substituted styrenes.

The phenol/diolefin polymer is then aralkylated with a styrene derivative in the presence of an acid catalyst to obtain the phenol aralkylation polymer. The same acid catalysts can be considered for styrene aralkylation of the above phenol aralkylation polymer as were used to react the aryldiolefin with the phenolic reactant. Indeed, in practice of this invention, the same catalyst is used to catalyze both the styrene and diolefin reactions with phenol and its derivatives. The final product can be neutralized with caustic, potassium hydroxide, or an amine or generally any alkaline material compatible in the system.

As a non limiting example for illustrative purposes only, the reaction of phenol with diisopropenyl benzene is set forth below.

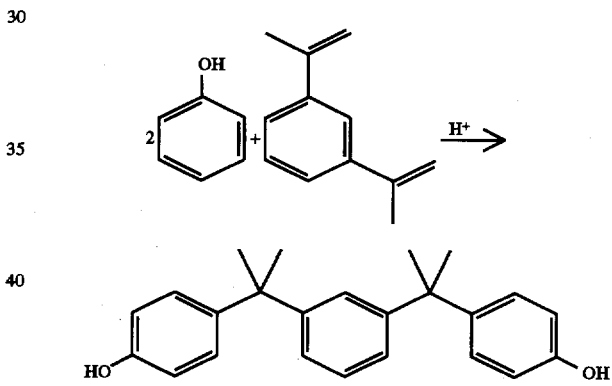

It will be noted that depending on the amount of diolefin, there will be a possibility of some ortho substitutions. However, it is recognized that the para substituted form will predominate due to stearic hindrance.

The phenol/diolefin polymer is then reacted with α-methyl-styrene.

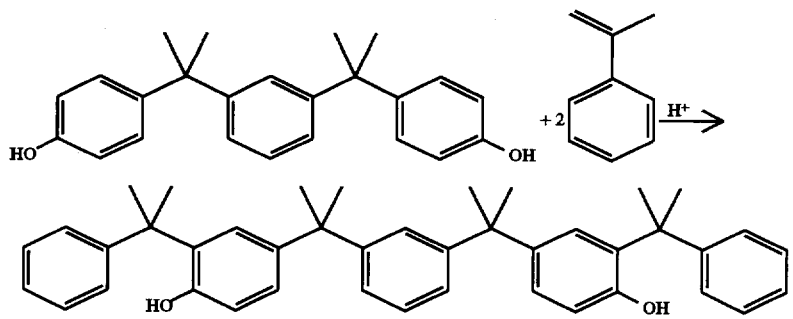

Polymers produced by initially reacting a phenol with an aryl diolefin generally result in higher melting point polymers than those produced by reaction of the aryldiolefin with preformed para styrenated phenolics.

Another example employing this reaction scheme reacts phenol and diisopropenylbenzene as above, and then further reaction with p-t-butyl styrene to provide a high melting point (95°–105° C. versus 35°–45° C. for similar p-styrenated phenolic based polymers), phenol aralkylation polymer depicted below and having good mineral spirits solubility.

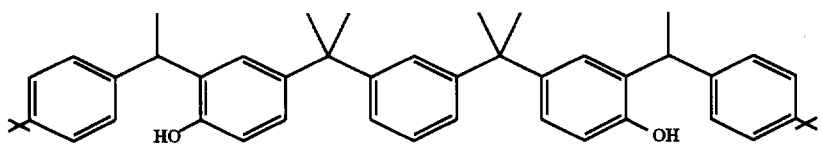

The acid catalyst may be any effective acid catalyst and is preferably methane sulfonic acid. However, the catalyst systems described earlier may be employed with advantage depending on the results desired. It will be noted that under conditions when neutralization of the catalyst with its removal by filtration is performed, that mineral acids may represent the most desired catalyst. For example, sulfuric or phosphoric acid are readily removed as their sodium or potassium neutralization salts. In contrast, under conditions where organic neutralization salts may be of an advantage by allowing their retention in the final product as a dissolved phase, the use of organic hydrophobic catalysts such as the alkyl naphthalene sulfonic acids and their amine neutralization products may be of an advantage. Amines can be selected from the group including primary, secondary and tertiary aliphatic ($C_1$–$C_{10}$) and aralkyl amines in which the amine substituents can be aromatic or benzylic in combination with aliphatic components ($C_1$ to $C_{10}$). A good neutralizing amine for purposes of these products would be diethyltertiary butyl amine.

Another embodiment of the present invention reacts the phenolic monomer with a portion of the aryl diolefin, and then reacts the remaining aryl diolefin after aralkylating the phenol with the styrene derivative. Polymers produced in this manner have advantages such as minimizing the potential for gel formation.

The present invention produces a resin with low monomer content (<1 percent and excellent yields without the use of formaldehyde. However, in either of the reaction schemes identified above, formaldehyde may be added at any stage of the reaction to increase phenol monomer linking. An aralkylation reaction including the addition of formaldehyde is demonstrated below.

First, phenol is aralkylated with α-methylstyrene.

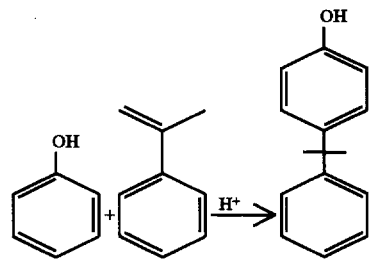

Then the product is reacted with formaldehyde.

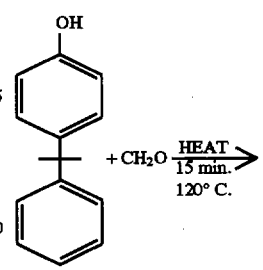

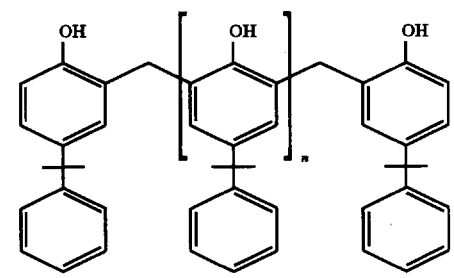

Then the product is reacted with divinyl benzene.

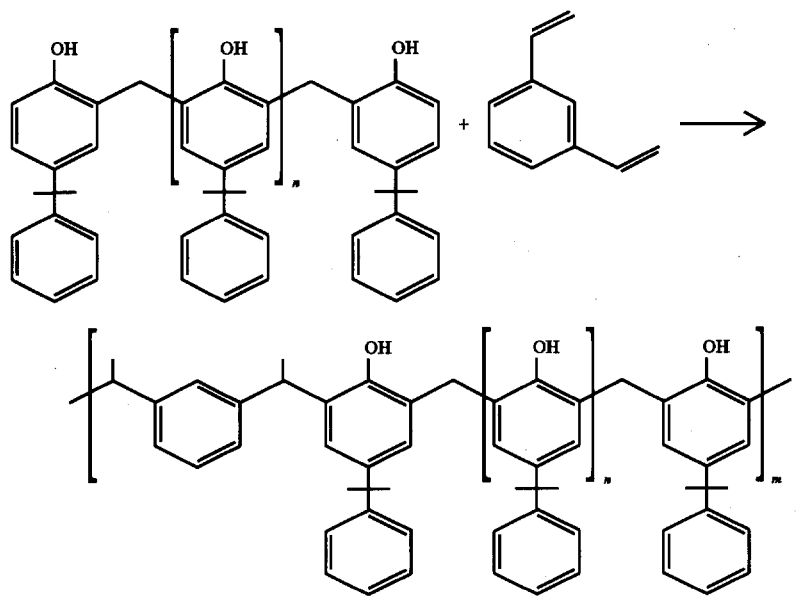

Other embodiments of the present invention include replacing up to 50% of the aryl diolefin with formaldehyde.

The following are more specific embodiments of the present invention.

A phenol aralkylation polymer is formed by reacting 1 mole of bisphenol A with from about 0.3 to 0.8 moles of an aryl diolefin to obtain a bisphenol A/aryl diolefin polymer and then aralkylating the polymer with at least one styrene derivative selected from the group consisting of p-t-butyl styrene, t-butyl styrene, vinyl toluene, α-methyl styrene, and styrene wherein from 20 to 100 percent of the open reactive sites of the polymer are occupied by styrene derived moieties.

In preparing this phenol aralkylation polymer, some or all of the styrene derivatives may be reacted with the bisphenol A prior to reacting with the aryl diolefin providing that adequate open reactive positions are retained, a mixture of an aryl diolefin and styrene derivatives may be coreacted with the bisphenol A and/or a portion of the bisphenol A may be replaced with t-butyl phenol.

A phenol aralkylation polymer is formed by reacting an aryl diolefin with phenol at a mole ratio of aryl diolefin-:phenol from about 0.4:1 to 1.0:1 to form a phenol/aryl diolefin polymer and then reacting the polymer with at least one styrene derivative selected from the group consisting of p-t-butyl styrene, t-butyl styrene, vinyl toluene, styrene, α-methyl styrene wherein from about 20 to 100 percent of the open reactive sites of the polymer are occupied by styrene derived moieties.

In preparing this aralkylation polymer, some or all of the styrene derivatives may be reacted with the phenol prior to reacting with the aryl diolefin, formaldehyde may be reacted with the polymer to increase molecular weight and reduce residual phenolic monomer levels, and/or a portion of the phenol may be replaced with t-butyl phenol.

The styrenated aralkylation phenolic polymers described herein can also be reacted with formaldehyde under basic conditions to generate resole systems having unique solubilities and other related performances advantages.

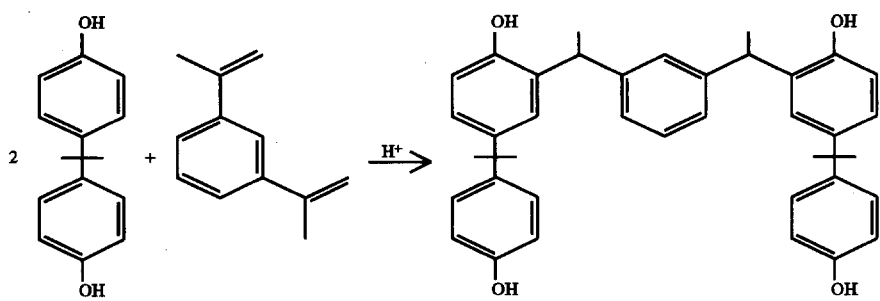

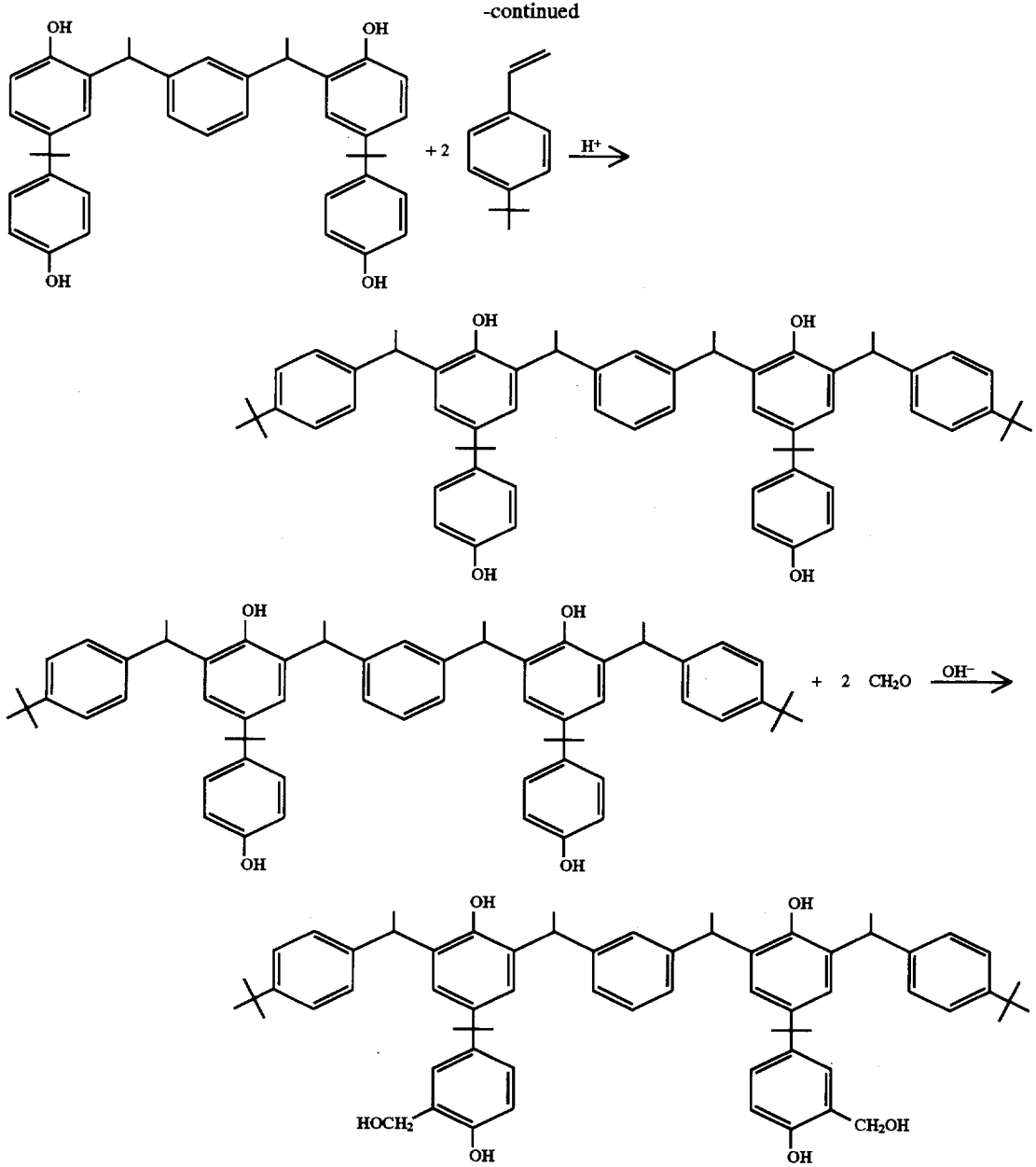

These latter polymer systems have utility in the preparation of adhesives and other useful products. One such class of adhesives described herein are cured with zinc complexes which require only the presence of phenolics with ortho methylols. Again, it must be emphasized that the systems described above are typical structures and that in reality, the t-butylstyrene adducts as well as the formaldehyde-based methylol groups can occupy any of the available ortho positions during their reactions.

For polymers used as additives in air-dry paints, p-t-butyl-styrene or a combination of p-t-butyl-styrene with α-methyl-styrene or vinyl toluene are preferred.

EXAMPLES

The invention will be further described by reference to the following examples. These examples should not be construed in any way as limiting the invention.

The solubility of the following examples was determined using a 50 wt % solution of the phenol aralkylation polymer in a 5% n-butano/mineral spirits solution.

In general, if a strong acid catalyst is employed, the type of equipment that can be used to produce the polymer is limited, for example, glass lined or stainless steel reactors should be used. Even very small amounts of residual phenol will cause poor color retention and reduce compatibility with oils. Steam stripping or a TFE (thin film evaporator) may be required to get the monomer concentrations down to the appropriate levels. This problem was eliminated when bisphenol A was used as the phenolic component. Analytical data have shown that low (less than 0.5 percent) levels of free phenol in the resultant aralkylations polymer can be attained in such polymer systems.

Example 1

A glass-lined reactor was purged with nitrogen. 188 g phenol and 0.6 g methane sulfonic acid catalyst were charged to the reactor and the mixture was heated to 120° C. An equal molar quantity (236 g) of α-methyl styrene was slowly added while maintaining the temperature. The reaction was exothermic and proceeded quickly. After this reaction had taken place, (130 g) diisopropenylbenzene (DIPB) was slowly added while continuing to keep the temperature at 120° C. Since the para position was the primary site of aralkylation for the initial reaction step, the main position for the diisopropenylbenzene to react was at an ortho position. This reaction was slower than the previous aralkylation.

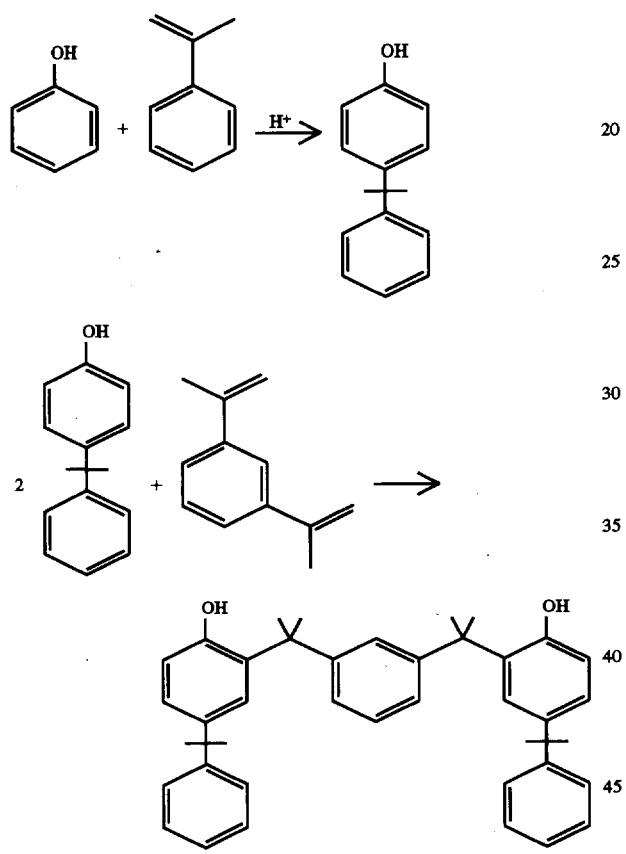

| | CK-2500* | Commercial Mead Resin | Inventive Resin |
|---|---|---|---|
| GPC | | | |
| Mn | 375 | 695 | 503 |
| Mw | 901 | 777 | 926 |
| Polydispersity | 2.4 | 1.1 | 1.8 |
| Solubility in Mineral Spirits | Limited | Limited | Excellent |
| Solution Viscosity | 340 Cp. | 225 Cp. | 133 Cp. |
| Initial Color | Off White | Off White | Off White |
| 3 Month Color | Beige | Off White | Off White |

*Commercial G.P. product based on t-butyl phenol.

Initially the CK-2500 had the lowest color. When used to produce a resin, the CK-2500 tended to discolor more than the other materials. The Mead resin and the inventive resin each had higher molecular weight and a lower solution viscosity than the CK-2500. Low viscosity was a definite advantage when formulating low V.O.C. products. Low viscosity means less solvents required.

The compatibility with mineral spirits was best with the inventive resin showing the utility of these systems in formulations requiring "HAP's free" solvents.

Example 2

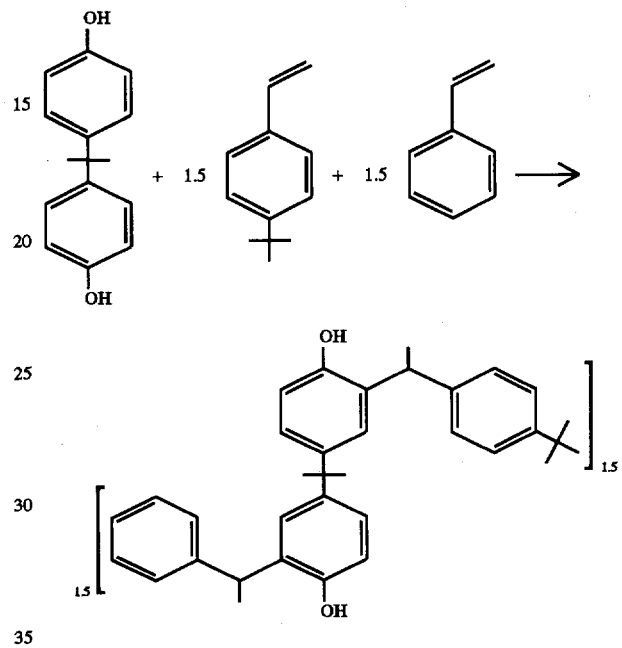

The reaction was run under a nitrogen atmosphere to minimize color pickup. 456 g bisphenol A was melted in a reactor at 140° C. 1.3 g of (70 percent) methylene sulfonic acid was charged as a catalyst. 354 g α-methyl styrene was added over 30 minutes at 150°–160° C. and then held for ½ hour. 480 g t-butyl styrene was added over 30 minutes at 150°–160° C. and held for 30 minutes. A low melting solid product was produced.

Example 3

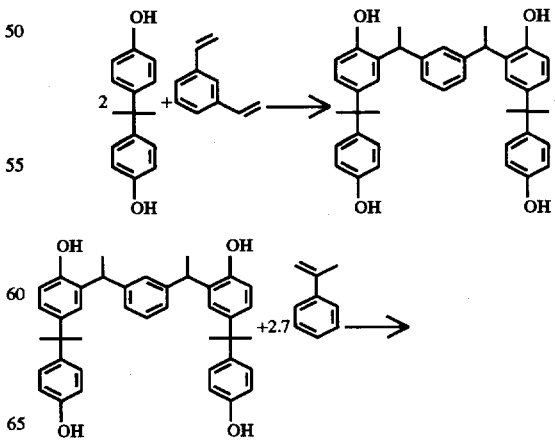

-continued

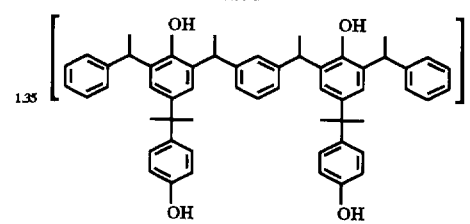

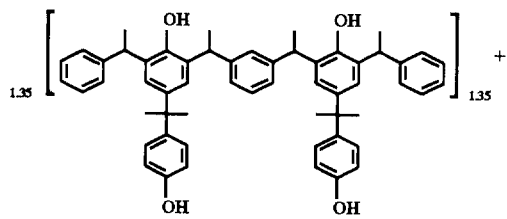

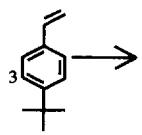

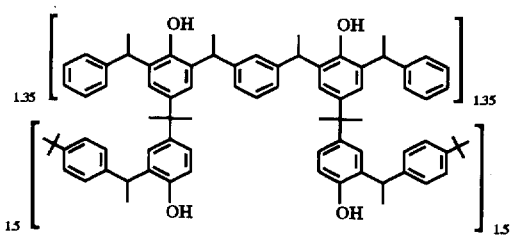

| Charge Components | Component Weight (g) |
| --- | --- |
| (1) Bisphenol A | 456 |
| (2) o-xylene | 200 |
| (3) 70% Methane sulfonic acid | 0.46 |

-continued

| Charge Components | Component Weight (g) |
| --- | --- |
| (4) divinyl benzene (80%) | 162 |
| (5) α-methyl styrene | 224 |
| (6) t-butyl styrene | 480 |

The reaction was run under a nitrogen atmosphere to minimize color pickup. Bisphenol A was melted in a reactor at 140° C. with 44% o-xylene based on bisphenol A. 20% of the divinyl benzene was charged to the reactor. Then 0.1 wt % based on bisphenol A of 70% methylene sulfonic acid was charged as a catalyst. O-xylene was distilled until clear to remove any water in the system. The remaining divinyl benzene was added over 20 minutes at 150°–160° C. and then held for ½ hour. α-Methyl styrene was added over 30 minutes at 150°–160° C. and held for 30 minutes. t-Butyl styrene was added over 30 minutes at 150°–160° C. and held for 30 minutes. The product was neutralized with 50% KOH and an excess equal to 0.1% of bisphenol charge (azeotrope $H_2O$) was added. After neutralization, the system was placed under vacuum and the o-xylene recovered from the system to produce a low melting solid (Mp 45°–55° C.). Analysis showed the absence of arylolefin and diolefin monomers. No detectable phenol or formaldehyde were found. The product exhibited excellent color, being a very light yellow. Pretreatment of the styrenes and aryldiolefins by passage through at alumina column removed traces of polymerization stabilizers (catechol and hydroquinone). Removal of these color-formers further improved the color performance of these polymers.

Example 4

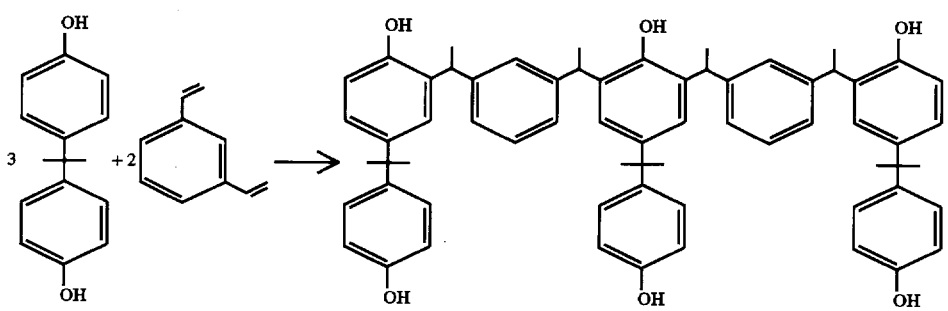

-continued

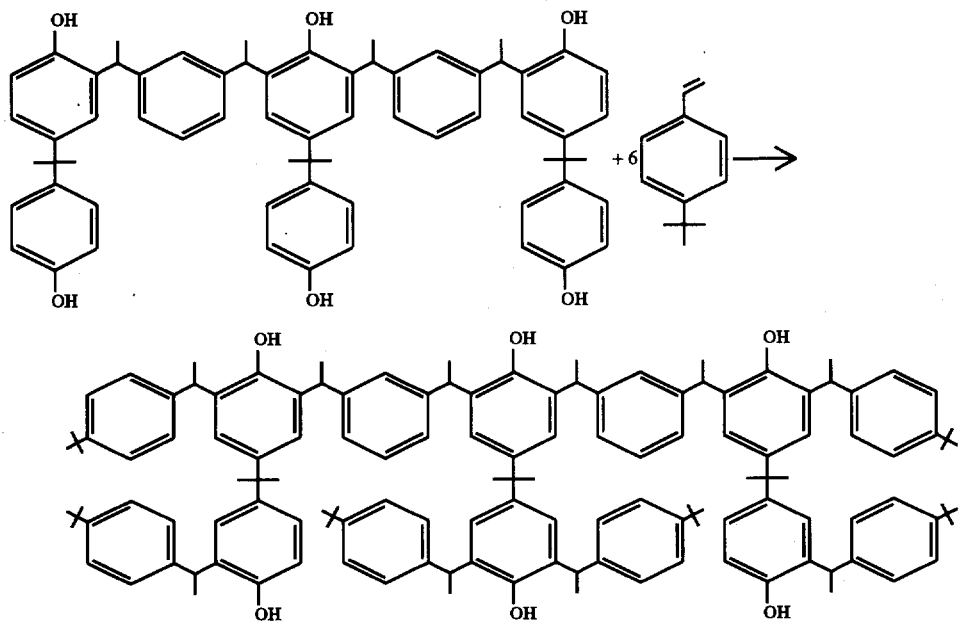

| Charge Components | Component Weight (gms) |
|---|---|
| (1) Bisphenol A | 212 |
| (2) o-xylene | 50 |
| (3) 70% Methane sulfonic acid | 0.21 |
| (4) divinyl benzene (80%) | 101 |
| (5) t-butyl styrene | 298 |

The reaction was run in a 1-liter resin kettle fitted with a stainless steel agitator. The reaction was run under a nitrogen atmosphere to minimize color pickup. Bisphenol A was melted in a reactor at 140° C. with 24% o-xylene based on bisphenol A. 20% of divinyl benzene was charged to the reactor. Then 0.1 wt % based on bisphenol A of 70% methylene sulfonic acid was charged as a catalyst. The remaining divinyl benzene was added over 20 minutes at 150°–160° C. and then held for ½ hour. Next, t-butyl styrene was added at a temperature of 150°–160° C. over a period of 30 minutes and then held at 150° C. for an additional 30 minutes. At this point, o-xylene was removed from the reactor by distillation. The resulting product was a solid (Mp 50°–60° C.). Analysis showed no trace of the olefin or diolefin monomers as well as phenol or formaldehyde.

Example 5

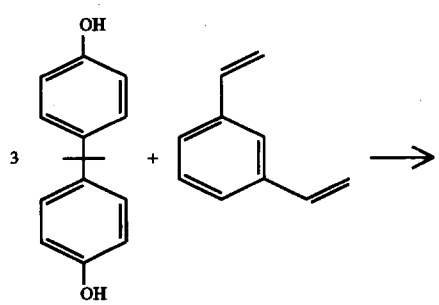

-continued

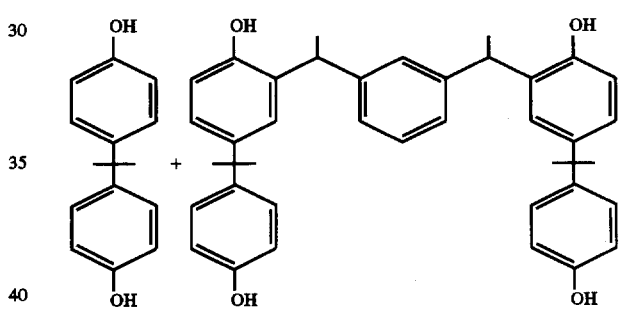

The following reaction was run in a 1 liter reactor. The reaction was run under a nitrogen atmosphere to minimize color pickup. 319.2 g bisphenol A was melted in a reactor at 140° C. along with 50 g of o-xylene. 0.3 g of 70% methane sulfonic acid catalyst and azeotrope water contained in the catalyst was charged using the o-xylene cosolvent. Charge 79 g of 80 percent divinyl benzene over 30 minutes at 140°–150° C. The mixture was reacted for an additional 30 minutes at the reaction temperature and then neutralized at 150° C. using a portion of 50 percent KOH equivalent to the methane sulfonic acid added. This effective three functional polymer product is capable of further reaction with styrene derivatives.

Example 6

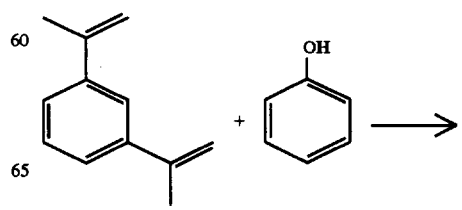

-continued

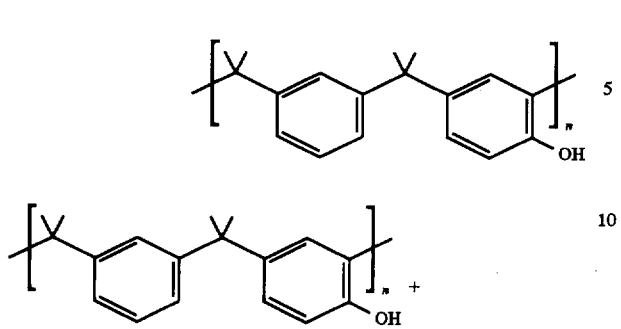

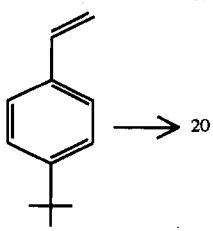

The reaction was run under a nitrogen atmosphere to minimize color pickup. 20 g of phenol was charged to a glass reactor fitted with a magnetic stirring bar and melt at 140° C. 0.02 g methane sulfonic acid (70 percent) was charged as a catalyst. 32 g diisopropenylbenzene was charged over 10 minutes at 140° C. and heated for additional 20 minutes at 140° C. Next, 28 g of p-t-butyl styrene was charged to the reaction mixture over 20 minutes and heated for an additional 20 minutes at 140° C. The mixture was neutralized with an equivalent of diethylene triamine and then cast at room temperature from a 140° C. melt to give a solid resin.

Example 7

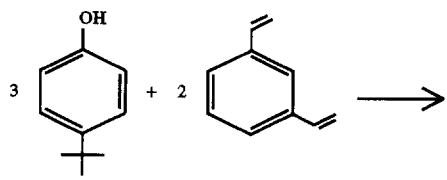

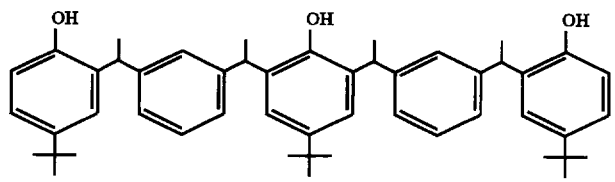

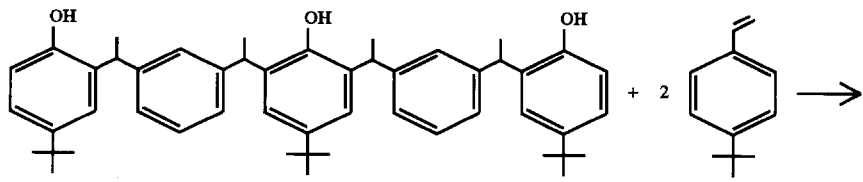

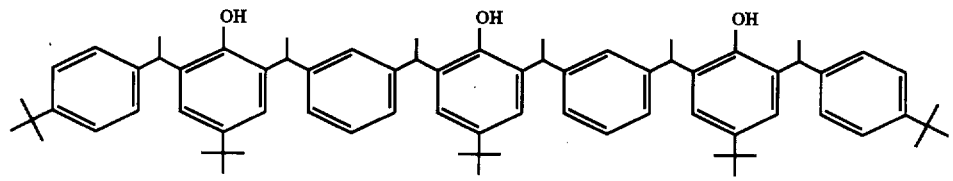

The reaction was run under a nitrogen atmosphere to minimize color pickup. 15 g of t-butyl phenol was charged into a glass reactor fitted with a magnetic stirring bar and melted at 140° C. 0.015 g of 70 percent methane sulfonic acid was charged. 10.3 g of 80 percent divinyl benzene was then charged over 5 minutes at 140° C. The reaction was continued at that temperature for an additional 10 minutes. Next, 10 g of p-t-butyl styrene was charged over 10 minutes and heated for an additional 10 minutes at the 140° C. reaction temperature. The mixture was neutralized with an equivalent of diethylene triamine required for the TSA catalyst. The product was cast at room temperature from the 140° C. melt to give a solid resin having a mp—80°–90° C. The resulting resin was tested for solubility in 5 percent butanol in mineral spirits and shown to be soluble in all proportions. Said phenolic resin was shown to contain no phenol or formaldehyde and was demonstrated to give excellent coating finishes when dissolved in a number of oil and alkyl-based vanishes.

Example 8

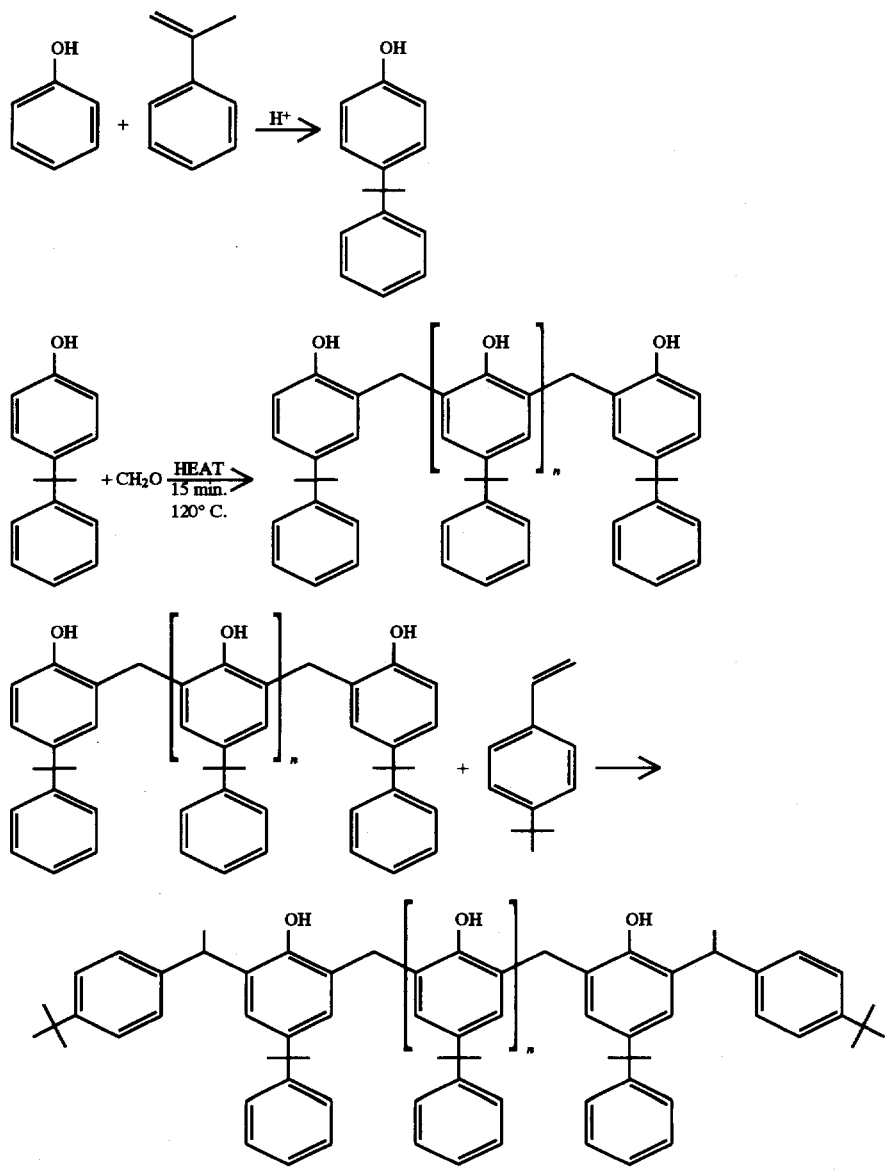

The reaction was run under a nitrogen atmosphere to minimize color pickup. 20 g of phenol was charged into a reactor and heated to 140° C. 0.02 grams of methane sulfonic acid (70 percent) was added as a catalyst. 20 g of o-xylene was added as an azeotropic solvent. 25 g α-methyl styrene was added over 10 minutes at 140° C. The mixture was heated for an additional 20 minutes at 140° C. 6.87 g of 50 percent formaldehyde solution was slowly added allowing water and water of condensation produced by the reaction with the phenolic component to be removed azeotropically over the addition period (20 minutes). After all formaldehyde was added, the mixture was allowed to continue heating for 20 minutes at 140° C. Reactions of the aforementioned type were run with a Dean Stark decanter which was maintained at a "full" condition with the selected azeotropic solvent. Finally, 17 g p-t-butylstyrene was charged over 15 minutes at 140° C. with continued heating for an additional 10 minutes after the addition was complete. At the end of this period an amount of diethylene triamine sufficient to neutralize the MSA catalyst was added. The resulting neutralization product was cast onto a cold surface at 140° C. to give a flakable product having a melting point of 70° C. and a solubility at all proportions in 5 percent butanol containing mineral spirits. The product performed well in varnish coatings. Various versions of the aforementioned polymer were produced in which a portion of the formaldehyde was replaced with aryl diolefins as the polymer chain extending agent. In these cases, infinite solubility in pure mineral spirits was attained. Thus, the polymer of this invention has been demonstrated to be a unique means of compatibilizing phenolic polymers into highly nonpolar polymer solvent systems having a broad range of utility It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A phenol aralkylation polymer produced by aralkylating a phenolic monomer with at least one styrene derivative in the presence of an acid catalyst to obtain an aralkylated phenol, then reacting the aralkylated phenol with an aryl diolefin to obtain the phenol aralkylation polymer, with the aralkylated phenol joined to the aryl diolefin primarily at the o position.

2. The phenol aralkylation polymer of claim 1 wherein the styrene derivative is one or more selected from the group consisting of styrene, α-methyl styrene, p-t-butyl styrene, p-ethyl styrene, m-ethyl styrene, p-vinyl toluene, mixed vinyl toluenes, mixed t-butyl styrenes, mixed ethyl styrenes, mixed t-butyl styrenes with di-t-butyl styrenes, and mixtures thereof.

3. The phenol aralkylation polymer of claim 2 wherein the styrene derivative is one or more selected from the group consisting of α-methyl styrene, p-t-butyl styrene, p-vinyl toluene, mixed vinyl toluenes and mixtures thereof.

4. The phenol aralkylation polymer of claim 1 wherein the aryl diolefin is selected from the group consisting of m-diisopropenylbenzene, p-diisopropenylbenzene, mixed diisopropenylbenzenes, m-divinylbenzene, p-divinylbenzene, and mixed divinylbenzenes.

5. The phenol aralkylation polymer of claim 1 wherein the phenolic monomer is selected from the group consisting of phenol, bisphenol A, bisphenol F, hydroquinone, resorcinol and catechol.

6. The phenol aralkylation polymer of claim 1 comprising, prior to reacting the aralkylated phenol with the aryl diolefin, adding an additional phenolic monomer selected from the group consisting of p-t-butyl phenol, p-cumyl phenol, p-octyl phenol, and polymers produced from the monomers.

7. The phenol aralkylation polymer of claim 1 comprising aralkylating the phenolic monomer with a portion of the styrene derivative, and reacting the remaining styrene derivative after reacting the aralkylated phenol with the aryl diolefin.

8. The phenol aralkylation polymer of claim 1 wherein all or a portion of the styrene or aryl diolefin is derived by dehydration of methyl benzylic alcohols.

9. A process of producing a phenol aralkylation polymer comprising aralkylating a phenolic monomer with at least one styrene derivative in the presence of an acid catalyst to obtain an aralkylated phenol, then reacting the aralkylated phenol with an aryl diolefin to obtain the phenol aralkylation polymer, with the aralkylated phenol joined to the aryl diolefin primarily at the o position.

10. The process of claim 9 wherein the styrene derivative is one or more selected from the group consisting of styrene, α-methyl styrene, p-t-butyl styrene, m-ethyl styrene, p-ethyl styrene, p-vinyl toluene, mixed vinyl toluenes, mixed t-butyl styrenes, mixed ethyl styrenes, mixed t-butyl styrenes with di-t-butyl styrenes, and mixtures thereof.

11. The process of claim 10 wherein the styrene derivative is one or more selected from the group consisting of α-methyl styrene, p-t-butyl styrene, p-vinyl toluene, mixed vinyl toluenes and mixtures thereof.

12. The process of claim 9 wherein the aryl diolefin is selected from the group consisting of m-diisopropenylbenzene, p-diisopropenylbenzene, mixed diisopropenylbenzene, m-divinylbenzene, p-divinylbenzene, and mixed divinylbenzenes.

13. The process of claim 9 wherein the phenolic monomer is selected from the group consisting of phenol, bisphenol A, bisphenol F, hydroquinone, resorcinol and catechol.

14. The process of claim 9 comprising, prior to reacting the aralkylated phenol with the aryl diolefin, adding an additional phenolic monomer selected from the group consisting of p-t-butyl phenol, p-cumyl phenol, p-octyl phenol and polymers produced from the monomers.

15. The process of claim 9 comprising aralkylating the phenolic monomer with a portion of the styrene derivative, and reacting the remaining styrene derivative after reacting the aralkylated phenol with the aryl diolefin.

16. The process of claim 9 further comprising deriving all or a portion of the styrene or aryl diolefin by dehydration of methyl benzylic alcohols.

17. The process of claim 9 wherein up to 50% of the aryl diolefin is replaced with formaldehyde.

18. The phenol aralkylation polymer of claim 1 wherein the mole ratio of aryl diolefin to said phenolic monomer is in the range of 0.2:1 to 1.1:1 and the aralkylation polymer exhibits a degree of styrenation in the range of 20 to 100%.

19. The phenol aralkylation polymer of claim 18 wherein the mole ratio of aryl diolefin to phenolic monomer is in the range of 0.4:1 to 0.8:1.

20. The phenol aralkylation polymer of claim 18 wherein the degree of styrenation is in the range of 40 to 95%.

21. The phenol aralkylation polymer of claim 19 wherein the degree of styrenation is in the range of 40 to 95%.

22. The process of producing a phenol aralkylation polymer of claim 9 wherein the mole ratio of aryl diolefin to phenolic monomer is in the range of 0.2:1 to 1.1:1 and the aralkylation polymer exhibits a degree of styrenation in the range of 20 to 100%.

23. The process of claim 22 wherein the mole ratio of aryl diolefin to phenolic monomer is in the range of 0.4:1 to 0.8:1.

24. The process of claim 22 wherein the degree of styrenation is in the range of 40 to 95%.

25. The process of claim 23 wherein the degree of styrenation is in the range of 40 to 95%.

26. A phenol aralkylation polymer produced by aralkylating a phenolic monomer with at least one styrene derivative in the presence of an acid catalyst to obtain an aralkylated phenol, then reacting the aralkylated phenol with an aryl diolefin to obtain the phenol aralkylation polymer, wherein the phenolic monomer has three or four free reactive aromatic ring positions for reaction with said styrene derivative and said aryl diolefin, the mole ratio of aryl diolefin to said phenolic monomer is in the range of 0.2:1 to 1.1:1 and the aralkylation polymer exhibits a degree of styrenation in the range of 20 to 100%.

27. The phenol aralkylation polymer of claim 26 wherein the mole ratio of aryl diolefin to phenolic monomer is in the range of 0.4:1 to 0.8:1.

28. The phenol aralkylation polymer of claim 26 wherein the degree of styrenation is in the range of 40 to 95%.

29. The phenol aralkylation polymer of claim 27 wherein the degree of styrenation is in the range of 40 to 95%.

30. The phenol aralkylation polymer of claim 26 wherein the phenolic monomer is selected from the group consisting of phenol, bisphenol A, bisphenol F, hydroquinone, resorcinol catechol and mixtures thereof.

31. A process of producing a phenol aralkylation polymer comprising aralkylating a phenolic monomer with at least one styrene derivative in the presence of an acid catalyst to obtain an aralkylated phenol, then reacting the aralkylated phenol with an aryl diolefin to obtain the phenol aralkylation polymer, and wherein the phenolic monomer has three or four free reactive aromatic ring positions for reaction with said styrene derivative and said aryl diolefin, the mole ratio of aryl diolefin to phenolic monomer is in the range of 0.2:1 to 1.1:1 and the aralkylation polymer exhibits a degree of styrenation in the range of 20 to 100%.

32. The process of claim 31 wherein the mole ratio of aryl diolefin to phenolic monomer is in the range of 0.4:1 to 0.8:1.

33. The process of claim 31 wherein the degree of styrenation is in the range of 40 to 95%.

34. The process of claim 32 wherein the degree of styrenation is in the range of 40 to 95%.

35. The process of claim 31 wherein the phenolic monomer is selected from the group consisting of phenol, bisphenol A, bisphenol F, hydroquinone, resorcinol, catechol and mixtures thereof.

* * * * *